United States Patent
Chonan et al.

(10) Patent No.: US 9,102,790 B2
(45) Date of Patent: *Aug. 11, 2015

(54) POLYESTER RESIN, ELECTROSTATIC CHARGE IMAGE DEVELOPING TONER, AND TONER CONTAINER

(71) Applicant: FUJI XEROX CO., LTD., Tokyo (JP)

(72) Inventors: Shiori Chonan, Kanagawa (JP); Sumiaki Yamasaki, Kanagawa (JP); Susumu Yoshino, Kanagawa (JP); Yuki Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,241

(22) Filed: May 20, 2014

(65) Prior Publication Data

US 2015/0126702 A1 May 7, 2015

(30) Foreign Application Priority Data

Nov. 5, 2013 (JP) ................................ 2013-229643

(51) Int. Cl.
- *C08G 64/00* (2006.01)
- *C08G 63/199* (2006.01)
- *G03G 9/087* (2006.01)
- *C08G 63/02* (2006.01)

(52) U.S. Cl.
CPC .......... *C08G 63/199* (2013.01); *G03G 9/08755* (2013.01)

(58) Field of Classification Search
CPC .............................. C08G 64/307; C08G 64/14
USPC .................................................. 528/196, 198
See application file for complete search history.

(56) References Cited

U.S. PATENT DOCUMENTS

| | | | |
|---|---|---|---|
| 4,814,249 A | 3/1989 | Oseto et al. | |
| 2013/0164672 A1* | 6/2013 | Shiozaki et al. | 430/124.1 |
| 2013/0244170 A1* | 9/2013 | Miyata et al. | 430/124.1 |
| 2013/0244171 A1* | 9/2013 | Yamasaki et al. | 430/124.1 |

FOREIGN PATENT DOCUMENTS

| | | |
|---|---|---|
| JP | A-62-226161 | 10/1987 |
| JP | A-2006-292820 | 10/2006 |

* cited by examiner

*Primary Examiner* — Terressa Boykin
(74) *Attorney, Agent, or Firm* — Oliff PLC

(57) ABSTRACT

A polyester resin is a polymer of a carboxylic acid component and an alcohol component including a rosin diol represented by the formula (1), wherein an acid value is from 10 mg KOH/g to 30 mg KOH/g, a content of carboxylic acid having a rosin skeleton in the resin is 1% by weight or less, and a content of carboxylic acid except carboxylic acid having the rosin skeleton in the resin is 1% by weight or less:

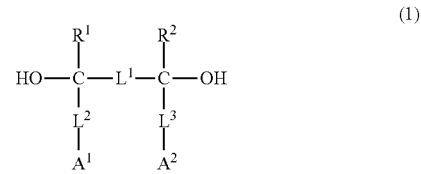

(1)

wherein, $R^1$ and $R^2$ each independently represent hydrogen or a methyl group, $L^1$, $L^2$ and $L^3$ each independently represent a divalent linking group selected from the group consisting of a carbonyl group, a carboxyl group, an ether group, a sulphonyl group, a chain alkylene group, a cyclic alkylene group, an arylene group, and combinations thereof, and $A^1$ and $A^2$ represent a rosin ester group.

14 Claims, 2 Drawing Sheets

POLYESTER RESIN, ELECTROSTATIC CHARGE IMAGE DEVELOPING TONER, AND TONER CONTAINER

CROSS-REFERENCE TO RELATED APPLICATIONS

This application is based on and claims priority under 35 USC 119 from Japanese Patent Application No. 2013-229643 filed Nov. 5, 2013.

BACKGROUND

Technical Field

The present invention relates to a polyester resin, an electrostatic charge image developing toner, and a toner container.

SUMMARY

According to an aspect of the invention, there is provided a polyester resin that is a polymer of a carboxylic acid component and an alcohol component including a rosin diol represented by the following formula (1),
wherein an acid value is from 10 mg KOH/g to 30 mg KOH/g, a content of carboxylic acid having a rosin skeleton in the resin is 1% by weight or less, and a content of carboxylic acid except carboxylic acid having the rosin skeleton in the resin is 1% by weight or less:

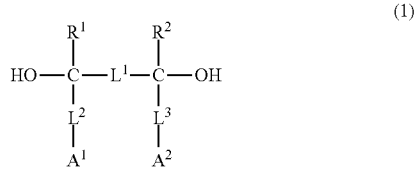

(1)

wherein in the formula (1), $R^1$ and $R^2$ each independently represent hydrogen or a methyl group; $L^1$, $L^2$ and $L^3$ each independently represent a divalent linking group selected from the group consisting of a carbonyl group, a carboxyl group, an ether group, a sulphonyl group, a chain alkylene group that may have a substituent, a cyclic alkylene group that may have a substituent, an arylene group that may have a substituent, and combinations thereof, and $L^1$ and $L^2$ or $L^1$ and $L^3$ may form a ring; and $A^1$ and $A^2$ represent a rosin ester group.

BRIEF DESCRIPTION OF THE DRAWINGS

Exemplary embodiments of the present invention will be described in detail based on the following figures, wherein.

DETAILED DESCRIPTION

Figure 1:
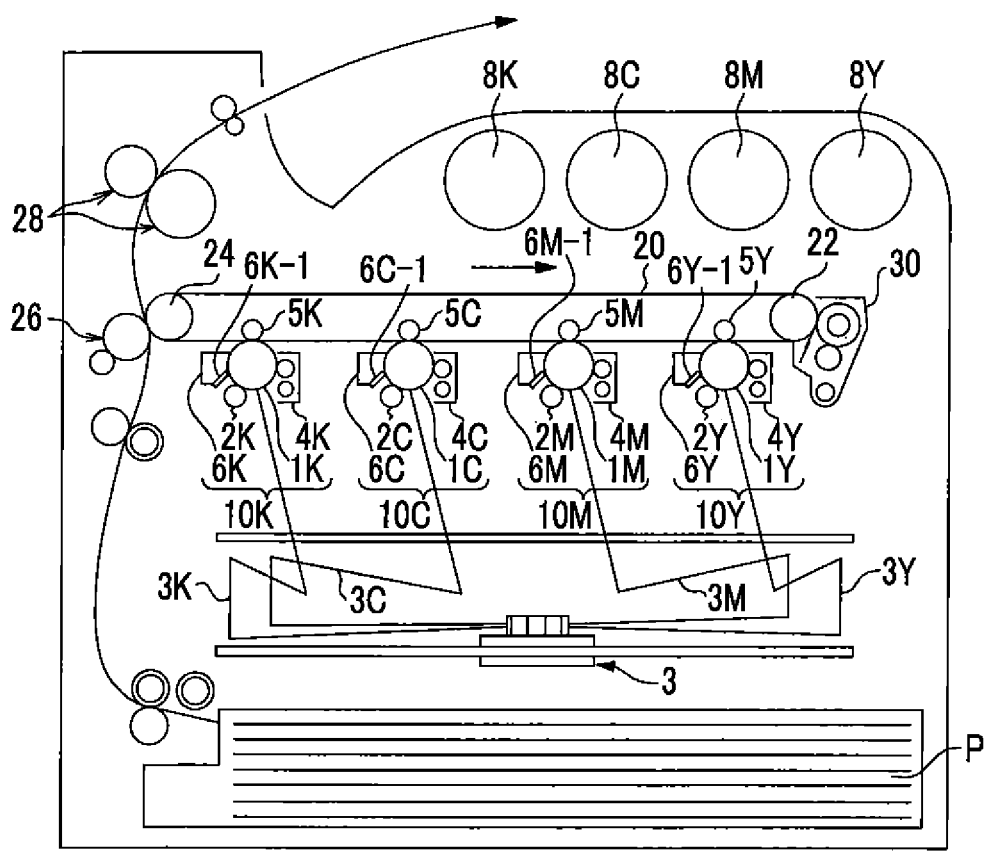
FIG. 1 is a schematic configuration diagram showing an example of an image forming apparatus according to the present exemplary embodiment.

Hereinafter, description will be given of an exemplary embodiment of the invention in detail.
Polyester Resin The polyester resin according to the present exemplary embodiment is a polymer of a carboxylic acid component and an alcohol component including a rosin diol (hereinafter, simply, also referred to as a "rosin diol") represented by the formula (1). Also, as to the polyester resin according to the present exemplary embodiment, an acid value is from 10 mg KOH/g to 30 mg KOH/g, a content of carboxylic acid having a rosin skeleton in the resin is 1% by weight or less, and a content of carboxylic acid except carboxylic acid having the rosin skeleton in the resin is 1% by weight or less.

The polyester resin according to the present exemplary embodiment is excellent in emulsifiability due to the composition described above. The reason for this is not clear; however, it is assumed that it is because of the reason described below.

The polyester resin is, for example, useful as a raw material of a resin product represented by a toner. The polyester resin as a raw material is often used as an emulsified liquid in which the resin is emulsified (polyester resin particle dispersion). When the emulsifiability of the polyester resin deteriorates, the particle size and the distribution of resin particles in the emulsified liquid also deteriorate, and thus this exercises an effect on the performance of the resin product.

Incidentally, the acid value of the polyester resin is a physical property value which contributes to the emulsifiability. Specifically, when the acid value of the polyester resin is set to from 10 mg KOH/g to 30 mg KOH/g, the emulsifiability of the polyester resin is enhanced.

However, it has been found that even the polyester resin in which the rosin dial is used as an alcohol component has the acid value in the range described above, the emulsifiability is low.

Here, the measurement of the acid value is usually performed by a neutralization titration method in accordance with JIS K0070. In the neutralization titration method, the acid value of the polyester resin is measured as an acid value including not only a high molecular weight component that exercises an effect on the emulsifiability of the resin, but also a low molecular weight component (monomer). Thus, even the acid value derived from a high molecular weight component is low, if the acid value derived from a low molecular weight component (monomer) is high, it is considered that the acid value of the polyester resin becomes to be within the range described above. Thus, it is considered that the emulsifiability is sometimes low, even the polyester resin has the acid value in the range described above.

In a case of the polyester resin in which the rosin diol is used as an alcohol component, it is considered that carboxylic acid having the rosin skeleton (that is, rosin) is included in the resin since a rosin ester group is released from a structural unit derived from a rosin diol. In addition, in a case of using the rosin diol in which the rosin is reacted with a bifunctional epoxy compound, it is considered that the unreacted rosin (carboxylic acid having the rosin skeleton) is included in the resin since the unreacted rosin remains. Thus, even if the acid value of the polyester resin is within the range described above, it is considered to become a state in which the acid value derived from a high molecular weight component is low and the acid value derived from a low molecular weight component (monomer) is high. Needless to say, it is considered to become the state described above when an unreacted substance of dicarboxylic acid that is the carboxylic acid component of the polyester resin also excessively remains in the resin.

In contrast, in the polyester resin that uses the rosin diol as an alcohol component, the content of carboxylic acid having the rosin skeleton in the resin is set to 1% by weight or less and carboxylic acid except carboxylic acid having the rosin skeleton in the resin is set to 1% by weight. Also, the acid value of the polyester resin having this composition is set to from 10 mg KOH/g to 30 mg KOH/g. That is, the acid value derived from a high molecular weight component (for example, a molecular weight of from 5,000 to 100,000) that exercises an effect on the emulsifiability is set to the range described above or a range close thereto. Thus, even as to the polyester resin in which the rosin diol is used as an alcohol component, if the acid value is set within the range described above, it is considered that the emulsifiability is enhanced.

From the above, it is considered that the polyester resin according to the present exemplary embodiment is excellent in emulsifiability. Also, in a case where the polyester resin according to the present exemplary embodiment is applied to a binder resin of an electrostatic charge image developing toner, the electrostatic charge image developing toner becomes an electrostatic charge image developing toner having an excellent fixing property.

Here, as to the polyester resin according to the present exemplary embodiment, it is preferable that the hydroxyl value be from 10 mg KOH/g to 30 mg KOH/g and also a difference between the acid value and the hydroxyl value be 10 mg KOH/g or less. By setting the acid value, the hydroxyl value and the difference between the acid value and the hydroxyl value within the range described above, the emulsifiability is more enhanced.

Here, the difference between the acid value and the hydroxyl value being 10 mg KOH/g or less indicates that the content of a medium molecular weight component having a carboxyl group (oligomer) and carboxylic acid monomer is small and the acid value derived from a high molecular weight component that exercises an effect on the emulsifiability (for example, molecular weight from 5,000 to 100,000) is in the range described above or a range close thereto. In a case where the reaction in which carboxylic acid and alcohol is 1:1 is equally performed, the number of carboxylic acid groups becomes equal to that of hydroxyl groups at a terminal of a polymer chain and in this case, the acid value and the hydroxyl value also become equal. The reason therefor is that in actuality, although the reaction is not uniform due to an effect of monocarboxylic acid owing to the desorption of rosin and the difference of reaction predominance between each monomer, it is considered that the smaller the difference, the closer the reaction is to a uniform reacting state between monomers, which is an ideal state.

Hereinafter, description will be given of a polyester resin according to the present exemplary embodiment in detail.

The polyester resin according to the present exemplary embodiment is a polymer of a carboxylic acid component and an alcohol component.

Carboxylic Acid Component

The carboxylic acid component includes, for example, dicarboxylic acid or a dicarboxylic acid diester. That is, in a case where the polyester resin is synthesized by a direct esterification method, dicarboxylic acid is included in the carboxylic acid component and in a case where the polyester resin is synthesized by an ester-exchanging method, a dicarboxylic acid diester is included.

Moreover, in the carboxylic acid component, other carboxylic acid or other carboxylic acid ester than dicarboxylic acid or a dicarboxylic acid diester may be included.

Dicarboxylic Acid

As dicarboxylic acid, for example, aromatic dicarboxylic acid and aliphatic dicarboxylic acid are included. Specifically, for example, aromatic dicarboxylic acid such as phthalic acid, isophthalic acid, terephthalic acid, 1,4-naphthalene dicarboxylic acid or 2,6-naphthalene dicarboxylic acid; aliphatic dicarboxylic acid such as oxalic acid, malonic acid, maleic acid, fumaric acid, citraconic acid, itaconic acid, glutaconic acid, succinic acid, adipic acid, sebacic acid, azelaic acid, dimer acid or alkyl succinic acid having a branched chain and from 1 to 20 carbon atoms; an acid anhydride thereof, and the like are included.

As dicarboxylic acid, in a case of imparting a crosslinked structure to the resin, unsaturated dicarboxylic acid having an ethylenically unsaturated double bond is also included. As unsaturated dicarboxylic acid, for example, fumaric acid, maleic acid, a maleic anhydride, itaconic acid, citraconic acid, mesaconic acid, glutaconic acid, traumatic acid, an acid anhydride thereof, and the like are included. As unsaturated dicarboxylic acid, for example, alkenyl succinic acid having an alkenyl group having a branched chain and from 1 to 20 carbon atoms, an acid anhydride thereof, and the like are included. Among those, as unsaturated carboxylic acid, fumaric acid, maleic acid, a maleic anhydride and itaconic acid are preferable, and fumaric acid, maleic acid and a maleic anhydride are more preferable.

Among these carboxylic acids, in a case where the polyester resin is applied for toner, the aromatic dicarboxylic acid is preferable, from the viewpoint of the durability and the fixing property of the toner, and the dispersibility of the coloring agent.

These carboxylic acids may be used as one kind alone or may be used in combination of two or more kinds thereof. However, as to the unsaturated dicarboxylic acid, it is preferable to be used together with dicarboxylic acid other than the unsaturated dicarboxylic acid, from the viewpoint of the manufacturing stability. Specifically, for example, it is preferable for the unsaturated dicarboxylic acid to be used together in an amount of from 5 mol % to 80 mol %, with respect to the entire dicarboxylic acid, it is more preferable to be used together from 10 mol % to 70 mol %, and it is still more preferable to be used together from 25 mol % to 60 mol %.

Here, the content of dicarboxylic acid to the carboxylic acid component is preferably from 80 mol % to 100 mol % and more preferably from 90 mol % to 100 mol %.

Dicarboxylic Acid Diester

As a dicarboxylic acid diester, for example, an aromatic dicarboxylic acid diester and an aliphatic dicarboxylic acid diester are included. Specifically, for example, an alkyl (from 1 to 3 carbon atoms) ester of aromatic dicarboxylic acid such as phthalic acid, isophthalic acid, terephthalic acid, 1,4-naphthalene dicarboxylic acid or 2,6-naphthalene dicarboxylic acid; an alkyl (from 1 to 3 carbon atoms) ester of aliphatic dicarboxylic acid such as oxalic acid, malonic acid, maleic acid, fumaric acid, citraconic acid, itaconic acid, glutaconic acid, succinic acid, adipic acid, sebacic acid, azelaic acid, dimer acid or alkyl succinic acid having a branched chain and from 1 to 20 carbon atoms; an acid anhydride thereof, and the like are included.

As a dicarboxylic acid diester, in a case of imparting a crosslinked structure to the resin, an unsaturated dicarboxylic acid diester having an ethylenically unsaturated double bond is also included. As an unsaturated dicarboxylic acid diester, for example, an alkyl (from 1 to 3 carbon atoms) ester of unsaturated carboxylic acid such as fumaric acid, maleic acid, a maleic anhydride, itaconic acid, citraconic acid, mesaconic acid, glutaconic acid or traumatic acid is included. As an unsaturated dicarboxylic acid diester, for example, an alkyl (from 1 to 3 carbon atoms) ester of alkenyl succinic acid having an alkenyl group having a branched chain and from 1 to 20 carbon atoms, and the like are included. Among those, as an unsaturated carboxylic acid diester, an alkyl (from 1 to 3 carbon atoms) ester of unsaturated carboxylic acid selected from fumaric acid, maleic acid, a maleic anhydride and itaconic acid is preferable, and an alkyl (from 1 to 3 carbon atoms) ester of unsaturated carboxylic acid selected from fumaric acid, maleic acid and a maleic anhydride is more preferable.

Among these carboxylic acid diesters, in a case where the polyester resin is applied for toner, the aromatic dicarboxylic acid diester is preferable, from the viewpoint of the durability and the fixing property of the toner, and the dispersibility of the coloring agent.

These carboxylic acid diesters may be used as one kind alone or may be used in combination of two or more kinds thereof. However, it is preferable for the unsaturated dicarboxylic acid diester to be used together with dicarboxylic acid diester other than the unsaturated dicarboxylic acid, from the viewpoint of the manufacturing stability. Specifically, for example, it is preferable for the unsaturated dicarboxylic acid diester to be used together in an amount of from 5 mol % to 80 mol %, with respect to the entire dicarboxylic acid diester, it is more preferable to be used together from 10 mol % to 70 mol %, and it is still more preferable to be used together from 25 mol % to 60 mol %.

Here, the content of the dicarboxylic acid diester to the carboxylic acid component is preferably from 80 mol % to 100 mol % and more preferably from 90 mol % to 100 mol %.

Other Carboxylic Acid or Another Carboxylic Acid Ester

As other carboxylic acid, trivalent or higher valent carboxylic acid is included, and for example, aromatic carboxylic acid such as 1,2,3-benzene tricarboxylic acid, 1,2,4-benzene tricarboxylic acid or 1,2,4-naphthalene tricarboxylic acid and an anhydride thereof are included.

As another carboxylic acid ester, a trivalent or higher valent carboxylic acid ester is included, and for example, alkyl (from 1 to 3 carbon atoms) ester of the exemplified trivalent or higher valent carboxylic acid is included.

Alcohol Component

The alcohol component includes the rosin diol. Moreover, the alcohol component may include another alcohol other than the rosin diol.

Rosin Diol

The rosin diol is a rosin diol represented by the following formula (1).

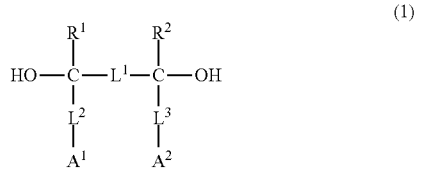

(1)

In the formula (1), $R^1$ and $R^2$ each independently represent hydrogen or a methyl group. $L^1$, $L^2$ and $L^3$ each independently represent a divalent linking group selected from the group consisting of a carbonyl group, an ester group, an ether group, a sulphonyl group, a chain alkylene group that may have a substituent, a cyclic alkylene group that may have a substituent, an arylene group that may have a substituent and combinations thereof, and $L^1$ and $L^2$ or $L^1$ and $L^3$ may form a ring, $A^1$ and $A^2$ represent a rosin ester group.

As the chain alkylene group represented by $L^1$, $L^2$ and $L^3$, for example, an alkylene group having from 1 to 10 carbon atoms is included.

As the cyclic alkylene group represented by $L^1$, $L^2$ and $L^3$, for example, a cyclic alkylene group having from 3 to 7 carbon atoms is included.

As the arylene group represented by $L^1$, $L^2$ and $L^3$, for example, a phenylene group, a naphthylene group and an anthracene group are included.

As examples of a substituent of the chain alkylene group, the cyclic alkylene group and the arylene group, an alkyl group that has 1 to 8 carbon atoms and an aryl group, and the like are included, and a linear, branched or a cyclic alkyl group is preferable. Specifically, a methyl group, an ethyl group, a propyl group, a butyl group, a pentyl group, a hexyl group, a heptyl group, an octyl group, an isopropyl group, an isobutyl group, s-butyl group, t-butyl group, an isopentyl group, a neopentyl group, a 1-methylbutyl group, an isohexyl group, a 2-ethylhexyl group, a 2-methylhexyl group, a cyclopentyl group, a cyclohexyl group, a phenyl group, and the like are included.

The rosin diol represented by the formula (1) contains two rosin ester groups in one molecule.

Moreover, the rosin ester group means a residue obtained by removing a hydrogen atom from a carboxyl group included in the rosin.

The rosin diol represented by the formula (1) is synthesized by a well-known method. Specifically, for example, the rosin diol is synthesized by a reaction of the rosin with a bifunctional epoxy compound.

Hereinafter, a synthesis scheme of the rosin diol is shown as an example.

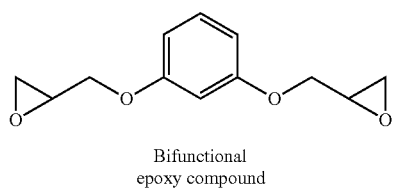

Bifunctional
epoxy compound

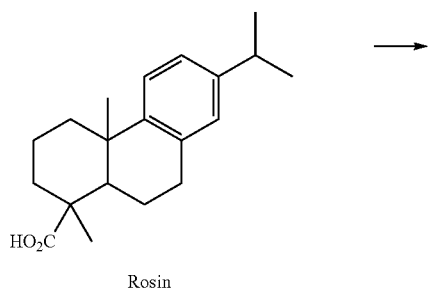

Rosin

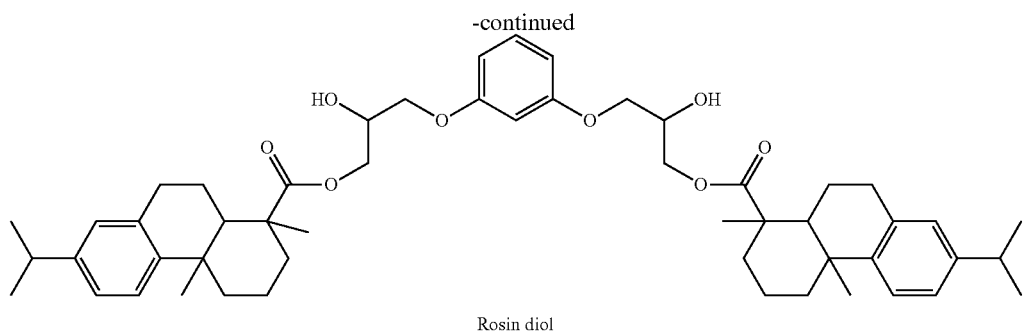

Rosin diol

The rosin is a general term for resin acid which is obtained from a tree and a substance derived from a natural product including abietic acid which is a kind of tricyclic diterpenes and isomers thereof as a major component. As a specific component, for example, palustric acid, neoabietic acid, pimaric acid, dehydroabietic acid, isopimaric acid, sandaracopimaric acid and the like are included, in addition to abietic acid, and the rosin used in the present exemplary embodiment is a mixture thereof. In the classification by a collection method, the rosins are classified roughly into three types which are a tall rosin using a pulp as a raw material, a gum rosin using a crude turpentine as a raw material, and a wood rosin using a stump of a pine tree as a raw material.

Since the rosin is easily obtained, a gum rosin or a tall rosin is preferable. It is desired that these rosins are refined, and the refined rosin is obtained by removing a high molecular weight substance which is considered to be originated from a peroxide of resin acid or an unsaponifiable substance included in the unrefined rosins, from the unrefined rosins. The refining method is not particularly limited, and well-known various types of refining methods may be selected. Specifically, a method such as distillation, recrystallization or extraction is included. It is industrially desired to perform refining by the distillation. The distillation is usually selected in consideration of distillation time at from 200° C. to 300° C. and at a pressure of 6.67 kPa or lower. The recrystallization, for example, is performed by dissolving the unrefined rosin in a good solvent, next distilling the solvent to prepare a concentrated solution and adding a poor solvent to this solution. As a good solvent, aromatic hydrocarbons such as benzene, toluene or xylene, chlorinated hydrocarbons such as chloroform, alcohols such as a lower alcohol, ketones such as acetone, acetic acid esters such as ethyl acetate, and the like are included, and as a poor solvent, a hydrocarbon solvent such as n-hexane, n-heptane, cyclohexane or isooctane is included. The extraction, for example, is a method of obtaining the refined rosin by preparing an alkali aqueous solution of the unrefined rosin by using alkali water, and neutralizing a water layer after an insoluble unsaponifiable substance included therein is extracted using an organic solvent.

The rosin may be a disproportionated rosin. The disproportionated rosin is one in which an unstable conjugated double bond in a molecule is eliminated by heating the rosin including abietic acid as a major component at a high temperature in the presence of a disproportionation catalyst, and a mixture of dehydroabietic acid and dihydroabietic acid as a major component.

As the disproportionation catalyst, various types of well-known ones such as a holding catalyst such as palladium carbon, rhodium carbon or platinum carbon, a metal powder such as nickel or platinum, an iodide such as iodine or iron iodide, or a phosphorus-containing compound are included. The amount of the catalyst used is usually from 0.01% by weight to 5% by weight and is preferably from 0.01% by weight to 1% by weight, with respect to the rosin, and the reaction temperature is from 100° C. to 300° C. and preferably from 150° C. to 290° C. Moreover, as for a method of controlling the amount of dehydroabietic acid, for example, dehydroabietic acid isolated by a method of crystallizing as an ethanolamine salt from the disproportionated rosin (J. Org. Chem., 31, 4246 (1996)) may be added so as to be in the range described above.

The rosin may be also a hydrogenated rosin. The hydrogenated rosin includes tetrahydroabietic acid and dihydroabietic acid as a major component and is obtained by eliminating an unstable conjugated double bond in a molecule by a well-known hydrogenation reaction. The hydrogenation reaction is performed by heating the unrefined rosin under pressurized hydrogen usually from 10 kg/cm$^2$ to 200 kg/cm$^2$ and preferably from 50 kg/cm$^2$ to 150 kg/cm$^2$ in the presence of a hydrogenation catalyst. As a hydrogenation catalyst, various types of well-known ones such as a holding catalyst such as palladium carbon, rhodium carbon or platinum carbon, a metal powder such as nickel or platinum, or an iodide such as iodine or iron iodide may be exemplified. The amount of the catalyst used is usually from 0.01% by weight to 5% by weight and is preferably from 0.01% by weight to 1.0% by weight, with respect to the rosin, and the reaction temperature is from 100° C. to 300° C. and preferably from 150° C. to 290° C.

As to the disproportionated rosin and the hydrogenated rosin, the refining process described above may be provided before or after a disproportionate treatment or a hydrogenation treatment.

The rosin may be a polymerized rosin obtained by polymerizing the rosin, an unsaturated carboxylic acid-modified rosin by adding an unsaturated carboxylic acid to the rosin, and a phenol-modified rosin. Moreover, as an unsaturated carboxylic acid used in the preparation of an unsaturated carboxylic acid-modified rosin, for example, maleic acid, a maleic anhydride, fumaric acid, acrylic acid, methacrylic acid, and the like are included. The unsaturated carboxylic acid-modified rosin is one which is modified by using usually from approximately 1 part by weight to 30 parts by weight of the unsaturated carboxylic acid with respect to 100 parts by weight of the rosin of a raw material.

Among those rosins, as a rosin, the refined rosin, the disproportionated rosin and the hydrogenated rosin are desirable, and they may be used alone or may be a mixture of any of them.

On the other hand, a bifunctional epoxy compound is one including two epoxy groups in a molecule, and a diglycidyl ether of an aromatic diol, a diglycidyl ether of an aromatic dicarboxylic acid, a diglycidyl ether of an aliphatic diol, a diglycidyl ether of an alicyclic diol, an alicyclic epoxide, and the like are included.

As a representative example of a diglycidyl ether of an aromatic diol, for example, a diglycidyl ether such as bisphenol A and derivatives of bisphenol A such as a polyalkylene oxide adduct of bisphenol A; bisphenol F and derivatives of bisphenol F such as a polyalkylene oxide adduct of bisphenol F; bisphenol S and derivatives of bisphenol S such as a polyalkylene oxide adduct of bisphenol S; resorcinol; t-butyl catechol; or biphenol is included.

As a representative example of a diglycidyl ether of an aromatic dicarboxylic acid, for example, a diglycidyl ether of terephthalic acid, iophthalic acid, phthalic acid or the like is included.

As a representative example of a diglycidyl ether of an aliphatic diol, for example, a diglycidyl ether of ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, polytetramethylene glycol or the like is included.

As a representative example of a diglycidyl ether of an alicyclic dial, for example, a diglycidyl ether of hydrogenated bisphenol A and derivatives of hydrogenated bisphenol A such as a polyalkylene oxide adduct of hydrogenated bisphenol A; cyclohexanedimethanol or the like is included.

As a representative example of an alicyclic epoxide, a limonene dioxide is included.

The bifunctional epoxy compound, for example, is obtained by a reaction of a dial component with epihalohydrin; however, the molecular weight may be increased by performing the polycondensation depending on the quantitative ratio thereof.

Here, the reaction of the rosin with the bifunctional epoxy compound mainly proceeds by a ring-opening reaction of a carboxyl group of the rosin with an epoxy group of the bifunctional epoxy compound. In doing so, the reaction temperature is preferably the melting temperature of both constituent components or higher or a temperature at which the mixing may be realized, and specifically, a range from 60° C. to 200° C. is common. In the reaction, a catalyst which promotes the ring-opening reaction of an epoxy group may be added.

As a catalyst, amines such as ethylenediamine, trimethylamine or 2-methyl imidazole, quaternary ammonium salts such as triethylammonium bromide, triethylammonium chloride or butyl trimethyl ammonium chloride, triphenylphosphine, and the like are included.

The reaction is performed by various methods, and for example, generally, in a case of a batch type, by putting the rosin and the bifunctional epoxy compound into a flask having a function of heating, provided with a cooling tube, a stirring apparatus, an inert gas introducing port, a thermometer and the like for heating and melting, and taking a sample of a reactant, and the reaction progress is traced. The degree of progress in the reaction is mainly confirmed by a decrease in acid value, and the reaction is completed at the time in which the reaction reaches the stoichiometric end point of the reaction or in the vicinity thereof.

As to the ratio of the reaction of the rosin and the bifunctional epoxy compound, the bifunctional epoxy compound is preferably in a range from 1.01 mols to 1.2 mols, more preferably from 1.03 mols to 1.15 mols, and further preferably from 1.05 mols to 1.1 mols, as a molar ratio, with respect to 2 mols of a rosin, in terms of decreasing the content of carboxylic acid having the rosin skeleton in the polyester resin.

The unreacted rosin (carboxylic acid having the rosin skeleton) becomes hard to remain in the rosin diol by reacting the rosin with the excessive bifunctional epoxy compound to obtain the rosin diol, and the content of carboxylic acid having the rosin skeleton in the polyester resin becomes easy to be in the range.

Hereinafter, as an exemplary compound of the rosin diol represented by the formula (1), for example, the exemplary compounds (1) to (42) described in JP-A-2012-229413 (the paragraph number 0059 to the paragraph number 0065 thereof) are included; however, the exemplary compound is not limited thereto.

These rosin diols may be used as one kind alone or may be used in combination of two or more kinds thereof.

Here, the content of the rosin diol to the entire alcohol component is preferably from 10 mol % to 100 mol % and more preferably from 20 mol % to 90 mol %.

Other Alcohol

As other alcohol, an aliphatic diol and an aromatic diol are included.

As an aliphatic diol, specifically, for example, ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosane decanediol, dimerdiol, 3-hydroxy-2,2-dimethylpropyl-3-hydroxy-2,2-dimethylpropano ate, diethylene glycol, triethylene glycol, polyethylene glycol, dipropylene glycol, polypropylene glycol and the like are included.

As an aromatic diol, a bisphenol A ethylene oxide adduct, a bisphenol A propylene oxide adduct, a bisphenol A butylene oxide adduct and the like are included.

These other alcohols may be used as one kind alone or may be used in combination of two or more kinds thereof.

Characteristics of Polyester Resin

The acid value of the polyester resin according to the present exemplary embodiment is from 10 mg KOH/g to 30 mg KOH/g, and it is preferable to be from 10 mg KOH/g to 20 mg KOH/g and it is more preferable to be from 10 mg KOH/g to 15 mg KOH/g, in terms of the emulsifiability.

The measurement of the acid value is performed by the neutralization titration method in accordance with JIS K0070 (1992). That is, the appropriate amount of a sample is fractionated, 100 ml of a solvent (a mixed liquid of diethyl ether/ethanol) and several droplets of an indicator (a phenolphthalein solution) are added thereto, and the solution is thoroughly shaken and mixed until the sample is dissolved in a water bath. The solution is titrated with 0.1 mol/l potassium hydroxide ethanol solution and the end point is set to the time at which the light red color of the indicator persists for 30 seconds. When the acid value is set to A, the amount of the sample is set to S (g), 0.1 mol/l potassium hydroxide ethanol solution used in the titration is set to B (ml) and f is set to a factor of 0.1 mol/l potassium hydroxide ethanol solution, the acid value is calculated as $A=(B \times f \times 5.611)/S$.

As to the hydroxyl value of the polyester resin according to the present exemplary embodiment, it is preferable to be from 10 mg KOH/g to 30 mg KOH/g in terms of the emulsifiability, and it is more preferable to be from 10 mg KOH/g to 20 mg KOH/g and it is still more preferable from 10 mg KOH/g to 20 mg KOH/g.

The measurement of the hydroxyl value is performed by the potentiometric titration method in accordance with JIS K0070 (1992). That is, the acid value of acetic acid generated by adding an acetic anhydride to the polyester resin which is then heated, acetylating a hydroxyl group in the polyester resin at the terminal by an acetylated reaction and decomposing the remained acetic anhydride with water is measured and the hydroxyl value is calculated.

As to the polyester resin according to the present exemplary embodiment, the acid value and the hydroxyl value are preferably in the range described above and it is preferable for the difference between the acid value and the hydroxyl value to be 10 mg KOH/g or less, in terms of the emulsifiability, and it is more preferable to be 5 mg KOH/g or less.

The weight average molecular weight (Mw) of the polyester resin according to the present exemplary embodiment is preferably from 40,000 to 150,000, more preferably from 45,000 to 100,000, and still more preferably from 50,000 to 90,000.

It is preferable for the weight average molecular weight to be 40,000 or more from the viewpoint of the heat storage stability. In addition, it is preferable for the weight average molecular weight to be 150,000 or less from the viewpoint of the low-temperature fixing property.

As to the number average molecular weight (Mn) of the polyester resin according to the present exemplary embodiment, it is preferable to be from 2,000 to 7,000 from the viewpoint described above, and it is more preferable to be from 3,000 to 6,500 and it is still more preferable to be from 3,500 to 6,000.

The molecular weight distribution (Mw/Mn) of the polyester for toner according to the present exemplary embodiment is preferably 12 or more, furthermore, more preferably from 12.5 to 20 and still more preferably from 14 to 18.

Moreover, the measurement of the weight average molecular weight Mw and the number average molecular weight Mn is performed using two of "HLC-8120 GPC and SC-8020 (manufactured by Tosoh Corporation 6.0 mmID×15 cm)" and using THF (tetrahydrofuran) as an eluent. The experiment is performed using an RI detector with a sample density of 0.5%, at a flow rate of 0.6 ml/min, a sample injection rate of 10 μl and a measurement temperature of 40° C. as experiment conditions. In addition, the calibration curve is made from 10 samples of "Polystyrene standard sample TSK standard"; "A-500", "F-1", "F-10", "F-80", "F-380", "A-2500", "F-4", "F-40", "E-128" and "F-700" manufacture by Tosoh Corporation.

The softening temperature of the polyester resin according to the present exemplary embodiment is preferably from 80° C. to 160° C. and more preferably from 90° C. to 150° C., from the viewpoint of the fixing property, the preserving property and the durability of the toner.

The softening temperature is measured as a temperature (FT ½ reduced temperature) which is equivalent to half of the height from the flow start point to the end point when 1 cm$^3$ of the sample is melted and flowed under the conditions of a pore size of the dies of 0.5 mm, a pressurization loading of 0.98 MPa (10 Kg/cm$^2$) and a temperature increase rate of 1° C./minute by using a Koka type flow tester CFT-500 (manufactured by Shimadzu Corporation).

As to the glass transition temperature of the polyester resin according to the present exemplary embodiment, it is preferable to be from 35° C. to 80° C. from the viewpoint of the fixing property, the preserving property and the durability, and it is more preferable to be from 40° C. to 70° C.

In addition, it is considered that the heat storage stability is ensured when the glass transition temperature is 55° C. or higher.

The measurement of the glass transition temperature is performed by heating 10 mg of the sample at a constant temperature increase rate (10° C./min) using a "DSC-20" (manufactured by SEIKO Electronics industrial Co., Ltd.).

The softening temperature and the glass transition temperature are easily adjusted by adjusting a raw material monomer composition, a polymerization initiator, the molecular weight, the amount of a catalyst or the like, or selecting the reaction conditions.

In the polyester resin according to the present exemplary embodiment, the content of carboxylic acid having the rosin skeleton in the resin is 1% by weight or less (preferably 0.8% by weight or less and more preferably 0.5% by weight or less), and the content of carboxylic acid except carboxylic acid having the rosin skeleton in the resin is 1% by weight or less (preferably 0.5% by weight or less and more preferably 0.3% by weight or less). Moreover, the lower limit of these contents is preferably 0% by weight; however, for example, the lower limit is 0.05% by weight or more due to manufacturing reasons.

Here, carboxylic acid having the rosin skeleton is the rosin produced by release of a rosin ester group which is included in the rosin diol and the unreacted rosin generated when the rosin diol is synthesized. On the other hand, carboxylic acid except carboxylic acid having the rosin skeleton is unreacted carboxylic acid generated when the polyester resin is synthesized. Moreover, hereinafter, these carboxylic acids are sometimes referred to as an "unreacted carboxylic acid" for convenience.

The measurement method of the content of carboxylic acid having the rosin skeleton is as follows. A polymer component is reprecipitated by adding a poor solvent after the minimum requirement of the polyester resin is dissolved in a good solvent. The content is calculated using the area value of a detected monomer peak by removing a deposition by the filtration and subjecting this solution to an HPLC (high performance liquid chromatography).

On the other hand, the content of carboxylic acid except carboxylic acid having the rosin skeleton is also measured by the same method as the measurement method of the content of carboxylic acid having the rosin skeleton described above.

Synthesis of Polyester Resin

The polyester resin according to the present exemplary embodiment is synthesized using the carboxylic acid component and the alcohol component as a raw material, for example, by a direct esterification method or an ester-exchanging method.

Specifically, in a case of being synthesized by the direct esterification method, the polycondensation reaction is progressed by the carboxylic acid component including carboxylic acid and the alcohol component including the rosin diol being directly subjected to the esterification reaction and the polyester resin is synthesized.

On the other hand, in a case of being synthesized by the ester-exchanging method, the polycondensation reaction is progressed by the carboxylic acid component including carboxylic acid and the alcohol component including the rosin diol being subjected to the ester-exchanging reaction and the polyester resin is synthesized. In the ester-exchanging method, after the polycondensation reaction is finished or at the end of the reaction, the oxidation imparting treatment is conducted by using carboxylic acid with respect to the polymer in which the polycondensation reaction is progressed.

Here, in the direct esterification method, since carboxylic acid is used as a carboxylic acid component, there is a tendency in which the unreacted carboxylic acid easily remains in the polyester resin after synthesizing. In addition, there is a tendency in which a medium molecular weight component (oligomer) becomes easy to be produced. In contrast, in the ester-exchanging method, since a carboxylic acid ester is used as a carboxylic acid component, the unreacted carboxylic acid is difficult to remain in the polyester resin after synthesizing. For this reason, the content of the unreacted carboxylic acid (carboxylic acid except carboxylic acid having the rosin skeleton) in the polyester resin after synthesizing becomes easy to be within the range described above. In addition, it becomes also difficult to produce the medium molecular weight component (oligomer). In addition to this, in the polyester resin after synthesizing, the acid value derived from the high molecular weight component which exercises an effect on the emulsifiability becomes easy to be within the range described above or a range close thereto, owing to conducting the oxidation imparting treatment. Moreover, in the ester-exchanging method, the residual of the unreacted portion of the alcohol component including the rosin diol is also suppressed, compared to the direct esterification method.

In addition, in the direct esterification method, in a case where plural types of carboxylic acids are used as a carboxylic acid component, carboxylic acid having high reactivity contributes to polymerization, carboxylic acid having low reactivity becomes easy to remain unreacted and there is a tendency that the deviation in the component derived from an acid in the high molecular weight component of the polyester resin after synthesizing occurs. In contrast, in the ester-exchanging method, in a case where plural types of carboxylic acids are used as a carboxylic acid component, since the ester-exchanging reaction is once conducted, all carboxylic acid components easily contribute to polymerization and the deviation in the component derived from an acid in the high molecular weight component of the polyester resin after synthesizing does not easily occur.

Furthermore, in the direct esterification method, the variance in reactivity between the carboxylic acid component and the alcohol component easily occurs, and for example, there is a tendency that the variation in the composition of the high molecular weight component occurs, for example, the high molecular weight component having few constituent units derived from the rosin diol is produced. In contrast, in the ester-exchanging method, since the ester-exchanging reaction is once conducted, the variation in the composition of the high molecular weight component is difficult to occur.

For this reason, as to the polyester resin according to the present exemplary embodiment, it is preferable to be synthesized by the ester-exchanging method. In particular, in a case where the polyester resin synthesized by the ester-exchanging method is applied for toner, since the variation in the composition of the high molecular weight component is small, a decrease in adhesion with a recording medium, caused by the high molecular weight component having fewer constituent units derived from the rosin diol is suppressed, as a result of this, a decrease in the maximum fixing temperature becomes easy to be improved. In addition, since the residual of the unreacted rosin diol having high hydrophobic property is also reduced, in the toner particles, the compatibility between the low molecular weight component of the polyester resin and a release agent is suppressed and the low-temperature fixing property becomes easy to be improved.

However, even in the direct esterification method, by the synthesis conditions as shown below, in the polyester resin after synthesizing, the content of the unreacted carboxylic acid (carboxylic acid except carboxylic acid having the rosin skeleton) may be set to be within the range described above and the acid value derived from the high molecular weight component that exercises an effect on the emulsifiability may be also set to be in the range described above or a range close thereto.

Specifically, carboxylic acid components as one kind or as several kinds thereof, of which the acid dissociation constants are close to each other, are reacted with the alcohol component in a substantially uniform state, the polymerization reaction is performed under reduced pressure, water that becomes a factor of hydrolysis is removed as much as possible, and the polyester resin is synthesized.

In the synthesis of the polyester resin according to the present exemplary embodiment, the polycondensation reaction may be promoted by a method of raising the reaction temperature by pressurizing, by a pressure reduction method or a method of flowing an inert gas under normal pressure. In addition, the polycondensation reaction may also be promoted by using a well-known and common reaction catalyst such as at least one kind of metallic compound selected from antimony, titanium, tin, zinc, aluminum and manganese. The additive amount of these reaction catalysts is preferably from 0.01 parts by weight to 1.5 parts by weight and more preferably from 0.05 parts by weight to 1.0 part by weight, with respect 100 parts by weight of the total amount of the carboxylic acid component and the alcohol component. As to the reaction temperature, it is preferable to be performed at the temperature from 180° C. to 300° C.

Moreover, when the polyester for toner according to the present exemplary embodiment is hydrolyzed, the polyester for toner is decomposed into a monomer described below.

Since the polyester is a 1:1 condensate of dicarboxylic acid and a diol, the constituent component of the resin is presumed from the decomposition product.

Other

The polyester resin according to the present exemplary embodiment also includes a modified-polyester resin. As a modified-polyester resin, for example, a polyester resin that is grafted or blocked with phenol, urethane, epoxy or the like by the methods described in JP-A-11-133668, JP-A-10-239903, JP-A-B-20636, or the like is included.

Electrostatic Charge Image Developing Toner

An electrostatic charge image developing toner according to the present exemplary embodiment includes the polyester resin according to the present exemplary embodiment.

Hereinafter, description will be given of a toner according to the present exemplary embodiment in detail.

A toner according to the present exemplary embodiment has, for example, toner particles, and an external additive as necessary.

Toner Particles

Description will be given of toner particles.

The toner particles are configured by containing a binder resin, and a coloring agent, a release agent and another additive as necessary.

Binder Resin

As a binder resin, an amorphous resin is included, and as an amorphous resin, the polyester for toner according to the present exemplary embodiment is applied.

As a binder resin, a crystalline resin may be used together with the amorphous resin.

As a binder resin, another amorphous resin other than the polyester for toner according to the present exemplary embodiment may be used together with the polyester for toner according to the present exemplary embodiment.

However, the content of the polyester according to the present exemplary embodiment is preferably 70 parts by weight or more and more preferably 90 parts by weight or more, with respect to 100 parts by weight of the entire binder resins.

Here, the amorphous resin is one which has not a clear endothermic peak but only a step-like endothermic change in a thermal analysis measurement using differential scanning calorimetry (DSC), and indicates one which is a solid at normal temperature (for example, 25° C.) and is thermoplasticized at a temperature of the glass transition temperature or higher.

On the other hand, the crystalline resin is one which has not a step-like endothermic quantity change but a clear endothermic peak in differential scanning calorimetry (DSC).

Specifically, for example, the crystalline resin means that the half-value width of the endothermic peak is within 10° C. when measuring at a temperature increase rate of 10° C./min and the amorphous resin means a resin in which the half-value width exceeds 10° C. or a resin in which a clear endothermic peak is not recognized.

As a crystalline resin, a crystalline polyester, a polyalkylene resin, a long-chain alkyl (meth)acrylate resin, and the like are included, however; a crystalline polyester is desired in terms of effecting greater change in viscosity by heating, furthermore from the viewpoint of achieving both the mechanical strength and the low-temperature fixing property.

As a crystalline polyester, for example, it is preferable to be a condensation polymer of an aliphatic dicarboxylic acid (including an acid anhydride and an acid chloride thereof) and an aliphatic diol from the viewpoint of realizing the low-temperature fixing property.

The content of the crystalline resin is preferably from 1 part by weight to 20 parts by weight and more preferably from 5 parts by weight to 15 parts by weight, with respect to 100 parts by weight of the entire binder resin.

Moreover, the low-temperature fixing means fixing by heating a toner at approximately 120° C. or lower.

As another amorphous resin, a well-known binder resin, for example, other resins such as a vinyl resin such as a styrene-acrylic resin, an epoxy resin, polycarbonate or polyurethane are included.

The content of the binder resin is, for example, preferably from 40% by weight to 95% by weight, more preferably from 50% by weight to 90% by weight and further preferably from 60% by weight to 85% by weight, with respect to the entire toner particles.

Coloring Agent

As a coloring agent, for example, various pigments such as carbon black, Chrome yellow, Hansa Yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, Du pont oil red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green or Malachite Green Oxalate or various kinds of dyes such as, acridine-based, xanthene-based, azo-based, benzoquinone-based, azine-based, anthraquinone-based, thioindigo-based, dioxazine-based, thiazine-based, azomethine-based, indigo-based, phthalocyanine-based, aniline black-based, polymethine-based, triphenylmethane-based, diphenylmethane-based or thiazole-based, and the like are included.

The coloring agent may be used as one kind alone or may be used in combination of two or more kinds thereof.

For the coloring agent, the coloring agent which is subjected to the surface treatment may be used as necessary, and also may be used together with a dispersant. In addition, plural types of coloring agents may be used together.

The content of the coloring agent, for example, is preferably from 1% by weight to 30% by weight and more preferably from 3% by weight to 15% by weight, with respect to the entire toner particles.

Release Agent

As a release agent, for example, hydrocarbon-based wax; natural wax such as carnauba wax, rice wax or candelilla wax; synthetic or mineral and petroleum-based wax such as montan wax; ester-based wax such as a fatty acid ester or a montan acid ester; and the like are included. The release agent is not limited thereto.

The melting temperature of the release agent is preferably from 50° C. to 110° C. and more preferably from 60° C. to 100° C.

Moreover, the melting temperature is determined by a "melting peak temperature" described in a method of determination of the melting temperature in "Testing Methods for Transition Temperatures of Plastics" in JIS K-1987 using a DSC-curve obtained by differential scanning calorimetry (DSC).

The content of the release agent, for example, is preferably from 1% by weight to 20% by weight and more preferably from 5% by weight to 15% by weight, with respect to the entire toner particles.

Other Additives

As other additives, for example, well-known additives such as a magnetic material, a charge-controlling agent, and an inorganic powder are included. These additives are included in the toner particles as an internal additive.

Characteristics or the Like of Toner Particles

The toner particles may be toner particles having a single layer structure or may be toner particles having a so-called core and shell structure configured by a core (core particles) and a coating layer which coats the core (a shell layer).

Here, as to the toner particles having the core and shell structure, for example, it is preferable to be configured by the core which is configured by containing the binder resin, and other additives such as the coloring agent and the release agent as necessary and the coating layer which is configured by containing the binder resin.

The volume average particle size (D50v) of the toner particles is preferably from 2 μm to 10 μm and more preferably from 4 μm to 8 μm.

Moreover, various types of average particle sizes and various types of particle size distribution indexes of the toner are measured using a Coulter Multisizer II (manufactured by Beckman Coulter, Inc.) and using ISOTON-II (manufactured by Beckman Coulter, Inc.) as an electrolyte solution.

When measuring, from 0.5 mg to 50 mg of the measurement sample is added into 2 ml of 5% aqueous solution of a surfactant (preferably sodium alkylbenzene sulfonate) as a dispersant. The obtained solution is added to from 100 ml to 150 ml of the electrolyte solution.

The electrolyte solution in which the sample is suspended is subjected to the dispersion treatment for 1 minute using an ultrasonic dispersion device, and the particle size distribution of the particles having the particle size in a range from 2 μm to 60 μm is measured using an aperture having an aperture diameter of 100 μm by using a Coulter Multisizer II. Moreover, the number of particles which are taken as a sample is 50,000.

The cumulative distributions of the volume and the number are respectively drawn from the small diameter side with respect to a particle size range (channel) divided based on the measured particle size distribution, and the particle size at cumulative 16% is defined as a volume average particle size D16v and a average number particle size D16p, the particle size at cumulative 50% is defined as a volume average particle size D50v and a number average particle size D50p, and the particle size at cumulative 84% is defined as a volume average particle size D84v and a number average particle size D84p.

By using these, the volume average particle size distribution index (GSDv) is calculated as $(D84v/D16v)^{1/2}$ and the number average particle size distribution index (GSDp) is calculated as $(D84p/D16p)^{1/2}$.

The shape factor SF1 of toner particles is preferably from 110 to 150 and more preferably from 120 to 140.

Moreover, the shape factor SF1 is determined by the following expression.

$$SF1=(ML^2/A)\times(\pi/4)\times 100 \qquad \text{Expression:}$$

In the expression, ML and A respectively represent an absolute maximum length of the toner and a projected area of the toner.

Specifically, the shape factor SF1 is quantified by mainly analyzing a microscopic image or a scanning electron microscopic (SEM) image using an image analysis apparatus and is calculated as follows. That is, the shape factor SF1 is obtained by capturing an optical microscopic image of particles spread on the surface of the slide glass in a LUZEX image analysis apparatus by a video camera, determining the maximum length and the projected area of the 100 particles, performing calculation by using the expression described above and determining the average value thereof.

External Additive

As an external additive, for example, inorganic particles are included. As the inorganic particles, $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO.SiO_2$, $K_2O.(TiO_2)n$, $Al_2O_3.2SiO_2$, $CaCO_3$, $MgCO_3$, $BaSO_4$, $MgSO_4$, and the like are included.

It is preferable for the surface of the inorganic particles as an external additive to be subjected to a hydrophobization treatment. The hydrophobization treatment is performed, for example, by dipping the inorganic particles into a hydrophobizing agent, or the like. The hydrophobizing agent is not particularly limited; however, for example, a silane-based coupling agent, silicone oil, a titanate-based coupling agent, an aluminum-based coupling agent and the like are included. They may be used as one kind alone or may be used in combination of two or more kinds thereof.

The amount of the hydrophobizing agent is usually, for example, from 1 part by weight to 10 parts by weight with respect to 100 parts by weight of the inorganic particles.

As an external additive, resin particles (resin particles such as polystyrene, PMMA or a melamine resin), a cleaning agent (for example, metal salt of a higher fatty acid represented by zinc stearate or particles of a fluorine-based high molecular weight material) and the like are included.

The external-added amount of the external additive is, for example, preferably from 0.01% by weight to 5% by weight and more preferably from 0.01% by weight to 2.0% by weight, with respect to the toner particles.

Method for Preparing Toner

Next, description will be given of a method for preparing the toner according to the present exemplary embodiment.

The toner according to the present exemplary embodiment is obtained by externally adding the external additive with respect to the toner particles after preparing the toner particles.

The toner particles may be prepared by either a dry type manufacturing method (for example, a kneading and pulverizing method, or the like) or a wet type manufacturing method (for example, an aggregation and coalescence method, a suspension polymerization method, a dissolution suspension method, or the like). The preparing method of the toner particles is not particularly limited to these preparing methods, and a well-known preparing method is employed.

Among those, it is preferable to obtain the toner particles by an aggregation and coalescence method.

Specifically, for example, in a case of preparing the toner particles by the aggregation and coalescence method, the toner particles are manufactured through a process of preparing a resin particle dispersion in which the resin particles which become the binder resin are dispersed (a resin particle dispersion preparing process), a process of forming aggregated particles by aggregating the resin particles (other particles as necessary) in the resin particle dispersion (in the dispersion after mixed with other particle dispersion as necessary) (an aggregated particle forming process), and a process of forming the toner particles by heating with respect to an aggregated particle dispersion in which the aggregated particles are dispersed, and coalescing the aggregated particles (a coalescence process).

Hereinafter, detailed description will be given of each process.

Moreover, in the following description, description will be given of a method of obtaining the toner particles including the coloring agent and the release agent, however; the coloring agent and the release agent are used as necessary. Needless to say, other additives except the coloring agent and the release agent may be used.

Resin Particle Dispersion Preparing Process

Firstly, for example, the coloring agent particle dispersion in which the coloring agent particles are dispersed and the release agent particle dispersion in which the release agent particles are dispersed are prepared, with the resin particle dispersion in which the resin particles which become the binder resin are dispersed.

Here, the resin particle dispersion, for example, is prepared by dispersing the resin particles in a dispersion medium by using a surfactant.

As a dispersion medium used in the resin particle dispersion, for example, a water-based medium is included.

As a water-based medium, for example, water such as distilled water or ion-exchanged water, alcohols, and the like are included. They may be used as one kind alone or may be used in combination of two or more kinds thereof.

As a surfactant, for example, an anionic surfactant such as sulfate ester salt-based, sulfonate salt-based, phosphate ester-based or soap-based surfactant; a cationic surfactant such as an amine salt type or a quaternary ammonium salt type surfactant; a nonionic-based surfactant such as polyethylene glycol-based, alkyl phenol ethylene oxide adduct-based or polyol-based surfactant, and the like are included. Among those, in particular, the anionic surfactant and the cationic surfactant are exemplified. The nonionic-based surfactant may be used together with the anionic surfactant or the cationic surfactant.

The surfactant may be used as one kind alone or may be used in combination of two or more kinds thereof.

In the resin particle dispersion, as a method of dispersing the resin particles in the dispersion medium, for example, a general dispersion method such as a rotary shearing type homogenizer, or a ball mill, a sand mill or Dyno mill having media is included. In addition, the resin particles may be dispersed in the resin particle dispersion, for example, by using a phase inversion emulsification method, depending on the type of the resin particles.

Moreover, the phase inversion emulsification method is a method in which the conversion of the resin from W/O to O/W (that is, phase inversion) is conducted to become a discontinuous phase and the resin is dispersed in particle-like state in an aqueous medium by dissolving the resin to be dispersed in a hydrophobic organic solvent in which the resin is soluble, adding a base to an organic continuous phase (O phase) for neutralization, afterward, putting an aqueous medium (W phase) thereto.

The volume average particle size of the resin particles dispersed in the resin particle dispersion for example, is preferably from 0.01 µm to 1 µm, more preferably from 0.08 µm to 0.8 µm and further preferably from 0.1 µm to 0.6 µm.

Moreover, the volume average particle size of the resin particles is measured by drawing the cumulative distribution from the small particle size side as to the volume with respect to the divided particle size range (channel) using the particle size distribution obtained by measurement using a laser diffraction particle size distribution measuring apparatus (for example, LA-700, manufactured by HORIBA, Ltd.) and setting the particle size at cumulative 50% with respect to the entire particles to the volume average particle size D50v. Moreover, the volume average particle size of the particles in another dispersion is also measured in the same way.

The content of the resin particles included in the resin particle dispersion, for example, is preferably from 5% by weight to 50% by weight and more preferably from 10% by weight to 40% by weight.

Moreover, in the same way as the resin particle dispersion, for example, the coloring agent particle dispersion and the release agent particle dispersion are also prepared. That is, the volume average particle size of the particles, the dispersion medium, the dispersion method and the content of the particles in the resin particle dispersion are the same as those of the coloring agent particles dispersed in the coloring agent particle dispersion and those of the release agent particles dispersed in the release agent particle dispersion.

Aggregated Particle Forming Process

Next, the coloring agent particle dispersion and the release agent particle dispersion are mixed with the resin particle dispersion.

Then, the aggregated particles including the resin particles, the coloring agent particles and the release agent particles having a diameter close to the intended diameter of the toner particles are formed by heteroaggregation of the resin particles, the coloring agent particles and the release agent particles in the mixed dispersion.

Specifically, for example, after the pH of the mixed dispersion is adjusted to acidic (for example, the pH is from 2 to 5) and a dispersion stabilizer is added as necessary, in addition to adding a flocculant into the mixed dispersion, the aggregated particles are formed by heating to the temperature of the glass transition temperature of the resin particles (specifically, for example, from temperature 30° C. lower than the glass transition temperature of the resin particles to temperature 10° C.

lower than the glass transition temperature of the resin particles) and aggregating the particles dispersed in the mixed dispersion.

In the aggregated particle forming process, for example, after the flocculant is added to the mixed dispersion at room temperature (for example, 25° C.) under stirring using a rotary and shearing type homogenizer, the pH of the mixed dispersion is adjusted to acidic (for example, the pH is from 2 to 5) and a dispersion stabilizer is added as necessary, the heating may be performed.

As a flocculant, for example, a surfactant having an opposite polarity to the surfactant used as a dispersant which is added to the mixed dispersion, for example, an inorganic metal salt and a divalent or higher valent metal complex are included. In particular, in a case where a metal complex is used as a flocculant, the used amount of the surfactant is reduced and the charging characteristics are improved.

An additive forming a complex or similar bond with a metal ion of the flocculant may be used as necessary. As this additive, a chelating agent is suitably used.

As an inorganic metal salt, for example, a metal salt such as calcium chloride, calcium nitrate, barium chloride, magnesium chloride, zinc chloride, aluminum chloride or aluminum sulfate, an inorganic metal salt polymer such as poly aluminum chloride, poly aluminum hydroxide or calcium polysulfide, and the like are included.

As a chelating agent, a water-soluble chelating agent may be used. As a chelating agent, for example, oxycarboxylic acid such as tartaric acid, citric acid or gluconic acid, iminodiacetic acid (IDA), nitrilotriacetic acid (NTA), ethylenediaminetetraacetic acid (EDTA), and the like are included.

The additive amount of the chelating agent, for example, is preferably from 0.01 parts by weight to 5.0 parts by weight and more preferably 0.1 parts by weight or more and less than 3.0 parts by weight, with respect to 100 parts by weight of the resin particles.

Coalescence Process

Next, the aggregated particles are coalesced to form the toner particles, for example, by heating to the glass transition temperature or higher of the resin particles (for example, the temperature 10° C. to 30° C. higher than the glass transition temperature of the resin particles or higher) with respect to the aggregated particle dispersion in which the aggregated particles are dispersed.

The toner particles are obtained through the above processes.

Moreover, the toner particles may be manufactured through a process of forming a second aggregated particles by further mixing the aggregated particle dispersion and the resin particle dispersion in which the resin particles are dispersed, after the aggregated particle dispersion in which the aggregated particles are dispersed is obtained, and aggregating in such a way as to further adhere the resin particles on the surface of the aggregated particles and a process of forming the toner particles having the core/shell structure by heating with respect to the second aggregated particle dispersion in which the second aggregated particles are dispersed and coalescing the second aggregated particles.

Here, after the coalescence process is finished, the toner particles in a drying state are obtained through a well-known washing process, solid and liquid separation process, and drying process to the toner particles formed in a solution.

In the washing process, it is preferable to thoroughly perform a displacement washing by ion-exchanged water in terms of charging property. In addition, the solid and liquid separation process is not particularly limited, however, it is preferable to perform a suction filtration, a pressure filtration or the like in terms of the productivity. In addition, also as to the drying process, a method thereof is not particularly limited, however, it is preferable to perform a freeze-drying, a flash jet drying, a fluidized drying, a vibrating type fluidized drying, or the like in terms of the productivity.

Then, the toner according to the present exemplary embodiment is manufactured, for example, by adding and mixing the external additive to the obtained toner particles in a dried state to mix. As to mixing, for example, it is preferable to be performed by a V blender, a Henschel mixer, a Loedige mixer, or the like. Furthermore, the coarse particles in the toner may be removed as necessary using a vibration sieve machine, an air classifier or the like.

Electrostatic Charge Image Developer

The electrostatic charge image developer according to the present exemplary embodiment is one that includes at least the toner according to the present exemplary embodiment.

The electrostatic charge image developer according to the present exemplary embodiment may be a single-component developer that includes only the toner according to the present exemplary embodiment or may be two-component developer in which the toner is mixed with a carrier.

As a carrier, there is no particular limitation, and a well-known carrier is included. As a carrier, for example, a coated carrier in which the surface of a core including a magnetic powder is coated by a coating resin; a magnetic powder dispersion type carrier in which a magnetic powder is dispersed and compounded in a matrix resin; a resin impregnation type carrier in which a porous magnetic powder is impregnated with the resin; and the like are included.

Moreover, the magnetic powder dispersion type carrier and the resin impregnation type carrier may be a carrier in which the constituent particles of the carrier are set to the core and the coating resin is coated thereon.

As a magnetic powder, for example, a magnetic metal such as iron, nickel or cobalt, a magnetic oxide such as ferrite or magnetite, and the like are included.

As conductive particles, particles such as a metal such as gold, silver or copper, carbon black, titanium oxide, zinc oxide, tin oxide, barium sulfate, aluminum borate or potassium titanate are included.

As a coating resin and a matrix resin, for example, polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid copolymer, a straight silicone resin configured by containing an organo siloxane bond or a modified product thereof, a fluorine resin, a polyester, a polycarbonate, a phenolic resin, an epoxy resin, and the like are included.

Moreover, another additive such as a conductive material may be included in the coating resin and the matrix resin.

Here, in order to coat the coating resin on the surface of the core, a method of coating by a solution for forming a coating layer in which the coating resin, and various types of additives as necessary are dissolved in a proper solvent, and the like are included. The solvent is not particularly limited, and may be selected by taking the coating resin which is used, an applying suitability, or the like into consideration.

As a specific resin coating method, a dipping method in which the core is dipped into the solution for forming a coating layer, a spray method in which the solution for forming a coating layer is sprayed onto the surface of the core, a fluidized bed method in which the solution for forming a coating layer is sprayed in a state in which the core is floated by a fluidized air, a kneader coater method in which the core of the carrier and the solution for forming a coating layer are mixed in a kneader coater and the solvent is removed, and the like are included.

The mixed ratio (weight ratio) of the toner and the carrier in the two-component developer is preferably toner: carrier=1:100 to 30:100 and more preferably toner: carrier=3:100 to 20:100.

Image Forming Apparatus/Image Forming Method

Description will be given of an image forming apparatus/an image forming method according to the present exemplary embodiment.

The image forming apparatus according to the present exemplary embodiment is provided with an image holding member, a charging unit that charges the surface of the image holding member, an electrostatic charge image forming unit that forms an electrostatic charge image on the surface of a charged image holding member, a developing unit that accommodates the electrostatic charge image developer and develops the electrostatic charge image formed on the surface of the image holding member as a toner image by the electrostatic charge image developer, a transfer unit that transfers the toner image formed on the surface of the image holding member onto the surface of a recording medium, and a fixing unit that fixes the toner image transferred onto the surface of the recording medium. Then, the electrostatic charge image developer according to the present exemplary embodiment is applied as an electrostatic charge image developer.

In the image forming apparatus according to the present exemplary embodiment, the image forming method (the image forming method according to the present exemplary embodiment) having the charging process of charging the surface of the image holding member, the electrostatic charge image forming process of forming the electrostatic charge image on the surface of the charged image holding member, the developing process of developing the electrostatic charge image formed on the surface of the image holding member as a toner image by the electrostatic charge image developer according to the present exemplary embodiment, the transfer process of transferring the toner image formed on the surface of the image holding member onto the surface of the recording medium, and the fixing process of fixing the toner image transferred onto the surface of the recording medium, is conducted.

A well-known image forming apparatus such as an apparatus of a direct transfer system for directly transferring the toner image formed on the surface of the image holding member onto the recording medium; an apparatus of an intermediate transfer system for primarily transferring the toner image formed on the surface of the image holding member onto the surface of the intermediate transfer member and secondarily transferring the toner image transferred onto the surface of the intermediate transfer member onto the surface of the recording medium; an apparatus provided with a cleaning unit that cleans the surface of the image holding member, after transferring the toner image and before charging; or an apparatus provided with an erasing unit that erases the surface of the image holding member by irradiation with a erasing light, after transferring the toner image and before charging, is applied to the image forming apparatus according to the present exemplary embodiment.

In a case of an apparatus of the intermediate transfer system, for example, a configuration having the intermediate transfer member in which the toner image is transferred on the surface, a primary transfer unit that primarily transfers the toner image formed on the surface of the image holding member onto the surface of the intermediate transfer member, and a secondary transfer unit that secondarily transfers the toner image transferred on the surface of the intermediate transfer member onto the surface of the recording medium is applied to the transfer unit.

Moreover, in the image forming apparatus according to the present exemplary embodiment, for example, the part including the developing unit may be a cartridge structure (a process cartridge) to be detachable from the image forming apparatus. As a process cartridge, for example, the process cartridge which accommodates the electrostatic charge image developer according to the present exemplary embodiment and is provided with the developing unit is suitably used.

Hereinafter, an example of the image forming apparatus according to the present exemplary embodiment will be shown, however, it is not particularly limited thereto. Moreover, description will be given of a principal portion shown in the figure and as to other portions, description thereof will be omitted.

FIG. 1 is a schematic configuration diagram showing the image forming apparatus according to an exemplary embodiment.

The image forming apparatus shown in FIG. 1 is provided with a first to fourth image forming units 10Y, 10M, 100 and 10K (an image forming unit) in an electrophotographic system in which the images of each color of yellow (Y), magenta (M), cyan (C) and black (K) based on the image data which is color-separated are output. These image forming units (hereinafter, simply, sometimes referred to as a "unit") 10Y, 10M, 100 and 10K are arranged in parallel apart from one another with the predetermined distance in a horizontal direction. Moreover, these units 10Y, 10M, 100 and 10K may be a process cartridge to be attached to and detached from the image forming apparatus.

In the drawing, above each unit 10Y, 10M, 100 and 10K, an intermediate transfer belt 20 as the intermediate transfer member is extended and arranged through each unit. The intermediate transfer belt 20 is provided by being wound on a driving roll 22 and a support roll 24 which is in contact with the inner surface of the intermediate transfer belt 20 which are installed apart from one another in a left to right direction in the figure and is set so as to be travelled in a direction from the first unit 10Y toward the fourth unit 10K. Moreover, the force is imparted to the support roll 24 in a direction away from the driving roll 22 by a spring or the like (not shown) and a tension is applied to the intermediate transfer belt 20 wound on both rolls. In addition, an intermediate transfer member cleaning apparatus 30 is provided on the side of the image holding member of the intermediate transfer belt 20, opposed to the driving roll 22.

In addition, the toners including the toners of four colors of yellow, magenta, cyan and black stored in the toner cartridges 8Y, 8M, 8C and 8K are respectively supplied to the developing apparatuses (the developing unit) 4Y, 4M, 4C and 4K in each unit 10Y, 10M, 10C and 10K.

Since the first to fourth units 10Y, 10M, 10C and 10K have similar configurations, description will be representatively given of the first unit 10Y forming a yellow image placed at the upstream side in a travelling direction of the intermediate transfer belt here. Moreover, descriptions of the second to fourth units 10M, 10C and 10K will be omitted by adding the reference signs added magenta (M), cyan (C) and black (K) to the part which is equal to the first unit 10Y, instead of yellow (Y).

The first unit 10Y has a photoreceptor 1Y which acts as an image holding member. A charging roll (an example of the charging unit) 2Y for charging the surface of the photoreceptor 1Y to the predetermined potential, an exposure apparatus (an example of the electrostatic charge image forming unit) 3 for exposing the charged surface with a laser beam 3Y based on an image signal which is color-separated to form an electrostatic charge image, a developing apparatus (an example of the developing unit) 4Y for supplying the electrostatic charge image with the charged toner to develop the electrostatic charge image, a primary transfer roll 5Y (an example of the primary transfer unit) for transferring the developed toner image onto the intermediate transfer belt 20 and a photoreceptor cleaning apparatus (an example of the cleaning unit) 6Y for removing the toner which remains on the surface of the photoreceptor 1Y after primary transfer are installed in order around the photoreceptor 1Y.

Moreover, the primary transfer roll 5Y is installed inside the intermediate transfer belt 20 and is set at a position opposed to the photoreceptor 1Y. Furthermore, the bias power sources (not shown) with which a primary transfer bias is applied are respectively connected to each primary transfer roll 5Y, 5M, 5C and 5K. Each bias power source varies the transfer bias applied to each primary transfer roll by controlling by a controller (not shown).

Hereinafter, description will be given of an operation of forming the yellow image in the first unit 10Y.

Firstly, before the operation, the surface of the photoreceptor 1Y is charged by the charging roll 2Y to the potential of −600 V to −800 V.

The photoreceptor 1Y is formed on a substrate having conductivity (for example, volume resistivity at 20° C.: $1 \times 10^{-6}$ Ωcm or less) by laminating a photosensitive layer. The photosensitive layer has usually a high resistance (a resistance of a general resin), however, the photosensitive layer has the property in which the resistivity of the part irradiated with the laser beam is changed when being irradiated with the laser beam 3Y. Therefore, the laser beam 3Y is output to the surface of the charged photoreceptor 1Y through an exposure apparatus 3 in accordance with the image data for yellow which is sent from the controller (not shown). The photosensitive layer on the surface of the photoreceptor 1Y is irradiated with the laser beam 3Y, thereby, the electrostatic charge image of an yellow image pattern is formed on the surface of the photoreceptor 1Y.

The electrostatic charge image is an image which is formed on the surface of the photoreceptor 1Y by charging and a so-called negative latent image formed as a result that the resistivity of the irradiated part of the photosensitive layer is reduced by the laser beam 3Y and a charge on the surface of the photoreceptor 1Y flows, while the charge of the part which is not irradiated with the laser beam 3Y remains.

The electrostatic charge image formed on the photoreceptor 1Y is rotated to the predetermined developing position in accordance with travelling of the photoreceptor 1Y. Then, the electrostatic charge image on the photoreceptor 1Y becomes a visible image (developed image) as a toner image by the developing apparatus 4Y at this developing position.

In the developing apparatus 4Y, for example, an electrostatic charge image developer including at least the yellow toner and the carrier is accommodated. The yellow toner is charged by friction by stirring inside the developing apparatus 4Y and is retained on a developer roll (an example of a developer holder) having the charge of the same polarity (negative polarity) as the charge on the photoreceptor 1Y. Then the yellow toner is electrostatically adhered at the erased latent image portion on the surface of the photoreceptor 1Y by the surface of the photoreceptor 1Y passing through the developing apparatus 4Y, and the latent image is developed by the yellow toner. The photoreceptor 1Y in which the toner image of yellow is formed is continuously travelled at the predetermined speed and the toner image which is developed on the photoreceptor 1Y is transported to the predetermined primary transfer position.

Once the yellow toner image on the photoreceptor 1Y is transported to the primary transfer position, the first transfer bias is applied to the primary transfer roll 5Y, the electrostatic force from the photoreceptor 1Y toward the primary transfer roll 5Y acts on the toner image, and the toner image on the photoreceptor 1Y is transferred onto the intermediate transfer belt 20. At this time, the transfer bias which is applied has the polarity which is a reverse polarity (+) to the polarity (−) of the toner, for example, the first unit 10Y is controlled to +10 µA by the controller (not shown).

On the other hand, the toner which remains on the photoreceptor 1Y is removed by the photoreceptor cleaning apparatus 6Y to be collected.

In addition, the primary transfer bias which is applied to the primary transfer rolls 5M, 5C and 5K of the second unit 10M and the subsequent units is also controlled in the same manner as for the first unit.

In this way, the intermediate transfer belt 20 on which the yellow toner image is transferred in the first unit 10Y is transported through the second to fourth units 10M, 10C and 10K in order and the toner images of each color are superimposed to be multi-transferred.

The intermediate transfer belt 20 on which the toner images of four colors are multi-transferred through the first to fourth units reaches a secondary transfer portion configured from the intermediate transfer belt 20, the support roll 24 which is in contact with the inner surface of the intermediate transfer belt and a secondary transfer roll (an example of the secondary transfer unit) 26 installed at the side of the image holding surface of the intermediate transfer belt 20. On the other hand, a recording paper (an example of the recording medium) P is fed to the gap in which the secondary transfer roll 26 comes into contact with the intermediate transfer belt 20 through a supply mechanism at the predetermined timing and the secondary transfer bias is applied to the support roll 24. At this time, the transfer bias which is applied has the polarity which is the same polarity (−) as the polarity (−) of the toner, the electrostatic force from the intermediate transfer belt 20 toward the recording paper P acts on the toner image and the toner image on the intermediate transfer belt 20 is transferred onto the recording paper P. Moreover, in this case, the secondary transfer bias is determined in accordance with the resistance detected by a resistance detecting unit (not shown) for detecting the resistance of the secondary transfer portion and the voltage thereof is controlled.

Afterward, the recording paper P is fed to a pressure contact portion (a nip portion) of a pair of fixing rolls in a fixing apparatus (an example of the fixing unit) 28, and the toner image is fixed on the recording paper P to form a fixed image.

As a recording paper P on which the toner image is transferred, for example, a plain paper used for a copying machine, a printer or the like in the electrophotographic system is included. The recording medium includes an OHP sheet and the like in addition to the recording paper P.

In order to further improve the smoothness of the image surface after fixing, the surface of the recording paper P is also preferably smooth, and for example, a coated paper in which the surface of the plain paper is coated by a resin or the like, an art paper for printing, and the like are suitably used.

The recording paper P in which the fixing of the color image is completed is discharged toward a discharge portion and a series of color image forming operations is finished.

Process Cartridge/Toner Cartridge

Description will be given of a process cartridge according to the present exemplary embodiment.

The process cartridge according to the present exemplary embodiment is a process cartridge which accommodates the electrostatic charge image developer according to the present exemplary embodiment, is provided with a developing unit in which the electrostatic charge image formed on the surface of the image holding member is developed as a toner image by the electrostatic charge image developer and is detachable from the image forming apparatus.

Moreover, the process cartridge according to the present exemplary embodiment is not limited to the configuration described above and the process cartridge may be configured by being provided with the developing apparatus and others which are at least one selected from other units such as, for example, the image holding member, the charging unit, the electrostatic charge image forming unit and the transfer unit as necessary.

Hereinafter, an example of the process cartridge according to the present exemplary embodiment will be shown; however, it is not limited thereto. Moreover, description will be given of a principal portion shown in the figure and as to other portions, description thereof will be omitted.

Figure 2:
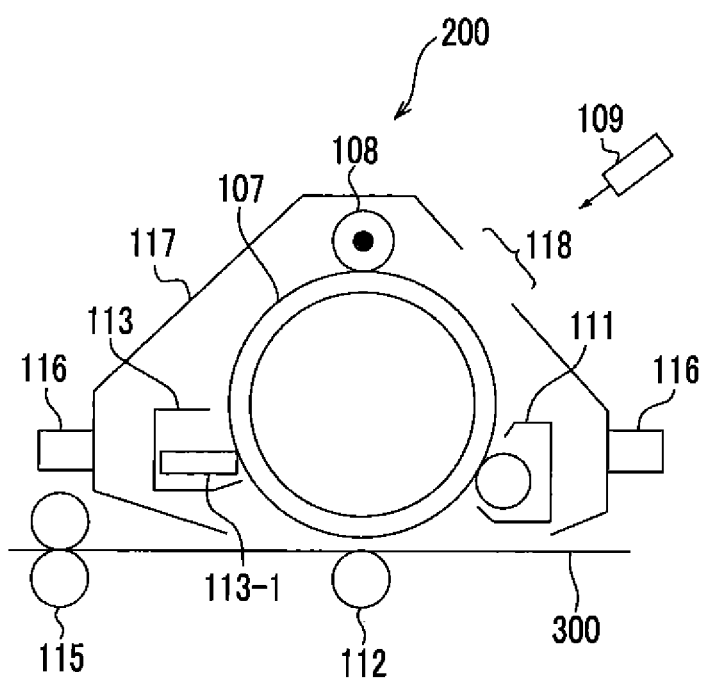
FIG. 2 is a schematic configuration diagram showing an example of a process cartridge according to the present exemplary embodiment.

FIG. 2 is a schematic configuration diagram showing the process cartridge according to the present exemplary embodiment.

A process cartridge 200 shown in FIG. 2, for example, is configured by integrally combining and retaining a photoreceptor 107 (an example of the image holding member), a charging roll 108 (an example of the charging unit), a developing apparatus 111 (an example of the developing unit) and a photoreceptor cleaning apparatus 113 (an example of the cleaning unit), provided around the photoreceptor 107 by using a housing 117 provided with a mounting rail 116 and a opening portion 118 for exposing to make a cartridge.

Moreover, in FIG. 2, 109 indicates an exposure apparatus (an example of the electrostatic charge image forming unit), 112 indicates a transfer apparatus (an example of the transfer unit), 115 indicates a fixing apparatus (an example of the fixing unit), and 300 indicates a recording paper (an example of the recording medium).

Next, description will be given of a toner cartridge according to the present exemplary embodiment.

The toner cartridge according to the present exemplary embodiment is a toner cartridge (toner container) which accommodates the toner according to the present exemplary embodiment and is detachable from the image forming apparatus. The toner cartridge is one which accommodates the toner for replenishment to be supplied to the developing unit provided in the image forming apparatus.

Moreover, the image forming apparatus shown in FIG. 1 is an image forming apparatus having a configuration from which the toner cartridges 8Y, 8M, 8C and 8K are detachable, the developing apparatuses 4Y, 4M, 4C and 4K are connected to the toner cartridges corresponding to each developing apparatus (colors) through the toner supply tubes (not shown). In addition, in a case where the toner accommodated in the toner cartridge runs low, this toner cartridge is replaced.

EXAMPLE

Hereinafter, specifically, description will be given of the present exemplary embodiment by giving Examples, however, the present exemplary embodiment is not limited to only Examples shown below. Moreover, in Examples, "part" and "%" mean "part by weight" and "% by weight", unless otherwise noted.

Synthesis of Rosin Diol
Synthesis of Rosin Diol (1)

200 parts of a gum rosin to which the refining treatment is performed by distillation (distillation condition: 6.6 kPa,) 220° as a rosin, 89 parts (the amount to 2 mol of a rosin compound: 1.05 mol) of a bisphenol A diglycidyl ether (trade name jER 828, manufactured by Mitsubishi Chemical Corporation) as a bifunctional epoxy compound and 0.4 part of tetraethylammonium bromide (manufactured by Tokyo Chemical Industry Co., Ltd.) as a reaction catalyst are charged into a reaction vessel made of stainless steel provided with a stirring apparatus, a heating apparatus, a cooling tube and a thermometer, the temperature is raised to 130° C. and a ring-opening reaction of an acid group in a rosin and an epoxy group in an epoxy compound is performed. The reaction is continuously performed for 4 hours at the same temperature, the reaction is stopped at the point in which the acid value becomes 0.5 mg KOH/g, and a rosin diol (1) represented by the exemplary compound is obtained.

Synthesis of Rosin Diol (2)

A rosin diol (2) is obtained in the same way as the rosin diol (1) except for using a neopentyl glycol diglycidyl ether (trade name SR-NPG, manufactured by Sakamoto Yakuhin Kogyo Co. Ltd.) as a bifunctional epoxy compound.

Synthesis of Rosin Diol (3)

A rosin diol (3) is obtained in the same way as the rosin diol (2) except for setting the amount of a neopentyl glycol diglycidyl ether to 85 parts (the amount to 2 mol of the rosin compound: 1.0 mol).

Synthesis of Polyester Resin
Synthesis of Polyester Resin (1): Ester-exchanging Method
Synthesis of Terephthalate Ester 3 parts by mol of dimethyl terephthalate, 6.66 parts of propylene glycol, 1 part of zinc acetate anhydride as a catalyst are charged into a reaction vessel made of stainless steel provided with a stirring apparatus, a heating apparatus, a thermometer, a fractionating apparatus and a nitrogen gas introduction pipe, the esterification is performed by heating at 200° C. for 7 hours under a nitrogen atmosphere to synthesize a terephthalic acid ester.

Synthesis of Succinic Acid Ester 0.33 part by mol of succinic acid, 6.66 parts of propylene glycol, 1 part of zinc acetate anhydride as a catalyst are charged into a reaction vessel made of stainless steel provided with a stirring apparatus, a heating apparatus, a thermometer, a fractionating apparatus and a nitrogen gas introduction pipe, the esterification is performed by heating at 200° C. for 7 hours under a nitrogen atmosphere to synthesize a succinic acid ester.

Synthesis of Polyester Resin (1)

All of the terephthalic acid ester and succinic acid ester which are obtained, 0.64 part by mol of the rosin dial (1) and $3.3 \times 10^{-3}$ parts by mol of tetra-n-butyl titanate (manufactured by Tokyo Chemical Industry Co., Ltd.) as a reaction catalyst are charged into a reaction vessel made of stainless steel provided with a stirring apparatus, a heating apparatus, a thermometer, a fractionating apparatus and a nitrogen gas introduction pipe, the ester-exchanging reaction is performed by heating at 190° C. for 60 minutes under a nitrogen atmosphere. Subsequently, after a pressure in the system is set to 3 kPa at 230° C. and the reaction is continued for 17 hours, 0.12 part by mol of carboxylic acid (fumaric acid) is added, the oxidation imparting treatment is performed to synthesize a polyester resin (1).

Synthesis of Polyester Resin (2): Ester-exchanging Method

A polyester resin (2) is synthesized in the same way as the polyester resin (1) except for changing from the rosin dial (1) to the rosin dial (2) and changing the reaction catalyst (tetra-n-butyl titanate) to zinc acetate anhydride (manufactured by Wako Pure Chemical Industries, Ltd.)

Synthesis of Polyester Resin (3): Ester-exchanging Method

A polyester resin (3) is synthesized in the same way as the polyester resin (1) except for changing from the rosin diol (1) to the rosin diol (2), changing from a succinic acid ester to a fumaric acid ester (a fumaric acid ester synthesized in the same way as a succinic acid ester except for changing from succinic acid to 0.35 part of fumaric acid (manufactured by Wako Pure Chemical Industries, Ltd.)) and changing the reaction catalyst (tetra-n-butyl titanate) to zinc acetate anhydride (manufactured by Wako Pure Chemical Industries, Ltd.).

Synthesis of Polyester Resin (4): Direct Esterification Method

Rosin diol (1): 0.64 part by mol
Terephthalic acid (Wako Pure Chemical Industries, Ltd.): 3 parts by mol
Succinic acid (Wako Pure Chemical Industries, Ltd.): 0.3 part by mol
Propylene glycol: 3.3 parts by mol
0.5 part by mol of tetra-n-butyl titanate (manufactured by Tokyo Chemical Industry Co., Ltd.) as a reaction catalyst with each component described above is charged into a reaction vessel made of stainless steel provided with a stirring apparatus, a heating apparatus, a thermometer, a fractionating apparatus and a nitrogen gas introduction pipe, the polycondensation reaction is performed by heating at 230° C. for 7 hours while stirring under a nitrogen atmosphere and a polyester resin (4) is synthesized by confirming that the intended molecular weight and the acid value are reached. Synthesis of polyester resin (5): Ester-exchanging method A polyester resin (5) is synthesized in the same way as the polyester resin (1) except for changing from the rosin diol (1)

to the rosin diol (2), changing the number of the parts of succinic acid to 0.42 part and changing the reaction catalyst to zinc acetate anhydride (manufactured by Wako Pure Chemical Industries, Ltd.).

Synthesis of Comparative Polyester Resin (C1): Direct Esterification Method

Rosin diol (1): 0.65 part by mol
    Terephthalic acid (manufactured by Wako Pure Chemical Industries, Ltd.): 3.2 parts by mol
    Dodecenyl succinic acid (manufactured by Tokyo Chemical Industry Co., Ltd.): 0.2 part by mol
    Fumaric acid: 0.2 part by mol
    Tetra-n-butyl titanate (manufactured by Tokyo Chemical Industry Co., Ltd.) as a reaction catalyst with each component described above is charged into a reaction vessel made of stainless steel provided with a stirring apparatus, a heating apparatus, a thermometer, a fractionating apparatus and a nitrogen gas introduction pipe, the polycondensation reaction is performed by heating at 230° C. for 7 hours while stirring under a nitrogen atmosphere and a comparative polyester resin (C1) is synthesized by confirming that the intended molecular weight and the acid value are reached.

Synthesis of Comparative Polyester Resin (C2): Direct Esterification Method

A comparative polyester resin (C2) is synthesized in the same way as the comparative polyester resin (C1) except for using 0.5 part by mol of succinic acid instead of dodecenyl succinic acid and fumaric acid.

Synthesis of Comparative Polyester Resin (C3): Direct Esterification Method

A comparative polyester resin (C3) is synthesized in the same way as the comparative polyester resin (C2) except for using the rosin diol (3) instead of rosin diol (1).

Preparation of Resin Particle Dispersion
Preparation of Resin Particle Dispersion (1)

After the polyester resin (1): 100 parts by weight is put into a reactor provided with a stirrer, and dissolved and mixed at 120° C. for 30 minutes, an aqueous solution for neutralization in which 1.0 part by weight of sodium dodecylbenzenesulfonate and 1.0 part by weight of 1N NaOH aqueous solution are dissolved in 800 parts by weight of ion-exchanged water which is heated to 95° C. is put into a flask and after the solution is emulsified for 5 minutes by using a homogenizer (manufactured by IKA K.K. ULTRA-TURRAX), the solution is further shaken in an ultrasonic bath for 10 minutes, afterward, the flask is cooled down in water at room temperature. In doing so, a resin particle dispersion (1) having a median size of the resin particles of 250 nm and a solid content of 20% by weight is obtained.

Preparation of Resin Particle Dispersions (2) to (5)

Resin particle dispersions (2) to (5) are respectively prepared in the same way as the resin particle dispersion (1) except for respectively using the polyester resins (2) to (5) instead of the polyester resin (1).

Preparation of Comparative Resin Particle Dispersions (C1) to (C3)

Comparative resin particle dispersions (C1) to (C3) are respectively prepared in the same way as the resin particle dispersion (1) except for respectively using the comparative polyester resins (C1) to (C3) instead of the polyester resin (1).

Preparation of Coloring Agent Particle Dispersion
Preparation of Coloring Agent Particle Dispersion (1)

Cyan pigment: 50 parts by weight (manufactured by Dainichiseika Color & Chemicals Mfg. Co., Ltd., copper phthalocyanine, C.I. Pigment Blue 15:3)
    Anionic surfactant (manufactured by DAT-IQIII KOGYO SEIYAKU CO., LTD., NEOGEN R): 5 parts by weight
    Ion-exchanged water: 200 parts by weight The components described above are mixed and dissolved, and dispersed by using a homogenizer (manufactured by IKA Japan K.K., ULTRA-TURRAX) for 5 minutes and an ultrasonic bath for 10 minutes and a cyan coloring agent particle dispersion (1) having a center diameter of 190 nm and a solid content of 21.5% is obtained.

Preparation of Release Agent Particle Dispersion
Preparation of Release Agent Particle Dispersion (1)

Anionic surfactant (manufactured by DAI-ICHI KOGYO SEIYAKU CO., LTD., NEOGEN R): 2 parts by weight
    Ion-exchanged water: 800 parts by weight
    Paraffin wax (HNP-9, manufactured by NIPPON SEIRO CO., LTD.) 200 parts by weight The components described above are mixed and heated to 120° C., the dispersion treatment is performed using a pressure ejecting type Gaulin homogenizer, and thereby 20% by weight release agent dispersion having a volume average particle size of 170 nm is obtained.

Preparation of Toner
Preparation of Toner (1)

Resin particle dispersion (1): 315 parts by weight
    Coloring agent particle dispersion (1): 40 parts by weight
    Release agent particle dispersion (1): 40 parts by weight
    Poly aluminium chloride: 0.15 part by weight
    Ion-exchanged water: 300 parts by weight In accordance with the combination described above, after the components are thoroughly mixed and dispersed in a round-shaped flask made of stainless steel using a homogenizer (manufactured by IKA Japan K.K., ULTRA-TURRAX T50), the solution is heated up to 42° C. while stirring the flask in an oil bath for heating and is retained at 42° C. for 60 minutes, afterward, 105 parts by weight of the resin particle dispersion (1) is added and gently stirred. Afterward, after the pH in a system is adjusted to 6.0 using 0.5 mol/liter sodium hydroxide aqueous solution, the solution is heated up to 95° C. while continuously stirring. During raising the temperature up to 95° C., the pH in the system is usually reduced to 5.0 or less, however, a sodium hydroxide aqueous solution is additionally added dropwise to retain the pH so as to be prevented from becoming 5.5 or less here.

After the reaction is finished, the solution is cooled, filtered and thoroughly washed with ion-exchanged water, afterward, the solid-liquid separation is performed by a Nutsche type suction filtration. Then, the solution is redispersed in 3,000 parts of ion-exchanged water at 40° C., stirred for 15 minutes at 300 rpm and washed. This washing operation is repeated five times, and the solid-liquid separation is performed by a Nutsche type suction filtration, subsequently, the vacuum drying is performed for 12 hours and toner particles (1) are obtained.

When the particle size of the toner particles (1) is measured by using a Coulter Multisizer II type, the volume average particle size D50v is 5.9 μm and the volume average particle size distribution index GSDv is 1.24. In addition, the shape factor SF1 of the toner particles is 126.

Next, 0.5 part by weight of silica (trade name: R812 (manufactured by Nippon Aerosil Co., Ltd.)) is added to 100 parts by weight of the obtained toner particles (1) and mixed by a high-speed blender to obtain a toner (1).

Preparation of Toners (2) to (5)

Toner particles (2) to (5) are respectively prepared in the same way as the toner particles (1) except for respectively using the resin particle dispersions (2) to (5) instead of the resin particle dispersion (1). Then, toners (2) to (5) are respectively prepared in the same way as the toner (1) except for using each toner particle (2) to (5) thus obtained.

Preparation of Comparative Toners (C1) to (C3)

Comparative toner particles (C1) to (C3) are respectively prepared in the same way as the toner particles (1) except for respectively using the comparative resin particle dispersions (C1) to (C3) instead of the resin particle dispersion (1). Then, comparative toners (C1) to (C3) are respectively prepared in the same way as the toner (1) except for using each toner particle (C1) to (C3) thus obtained.

Preparation of Developer

Preparation of Developer (1)

7 parts by weight of the toner (1) and 100 parts by weight of the carrier having the volume average particle size of 50 μm in which the surface of ferrite particles is coated by a methyl methacrylate-styrene copolymer are mixed by using a tumbler shaker mixer to obtain a developer (1).

Preparation of Developers (2) to (5)

Developers (2) to (5) are respectively prepared in the same way as the developer (1) except for respectively using the toners (2) to (5) instead of the toner (1).

Preparation of Comparative Developers (C1) to (C3)

Comparative developers (C1) to (C3) are respectively prepared in the same way as the developer (1) except for respectively using the comparative toners (C1) to (C3) instead of the toner (1).

Examples 1 to 5, Comparative Examples 1 to 3

Each developer (1) to (5) thus obtained is set to Examples 1 to 5 and each comparative developer (C1) to (C3) is set to Comparative Examples 1 to 3, and the following evaluations are conducted.

Composition and Physical Properties of Polyester Resin

Composition and physical properties of each polyester resin used in the developers in each example (in Table 1, written as "PE resin") are examined in accordance with the above-mentioned methods. Specifically, the content of carboxylic acid having the rosin skeleton in the resin (in Table 1, written as "the content of rosin"), the content of carboxylic acid except carboxylic acid having the rosin skeleton in the resin (in Table 1, written as "the content of unreacted carboxylic acid"), and the acid value and hydroxyl value of the polyester resin are examined. The results are shown in Table 1.

Emulsifiability of Polyester Resin

The emulsifiability of each polyester resin used in the developers in each example is evaluated as mentioned below.

5 g of polyester resin is dissolved in a solvent and neutralized, and water is added dropwise thereto to obtain emulsified latex. The particle size of the emulsified latex is measured by a Beckman Coulter. The evaluation criterion is as follows.

G1: The intermediate diameter is from 0.120 μm to 0.190 μm and the particles having the particle size of 1 μm or more do not exist.

G2: The intermediate diameter exceeds 0.090 μm and is 0.240 μm or less, and the particles having the particle size of 1 μm or more do not exist.

G3: The intermediate diameter exceeds 0.090 μm and is 0.240 μm or less, and the particles having the particle size of 1 μm or more exist.

G4: The intermediate diameter is 1 μm or more.

Fixing Latitude (Width of Fixable Temperature Region)

The developers in each example are used to a DocuCentre Color 500 remodeled machine manufactured by Fuji Xerox Co., Ltd. (one which is remodeled so as to fix by an external fixing device in which the fixing temperature is variable) to perform an image formation in such a way that the toner applied amount is adjusted to 13.5 g/m$^2$ on a paper for color (J paper) manufactured by Fuji Xerox Co., Ltd. After the image is formed, the image is fixed with the nip width of 6.5 mm at the fixing speed of 180 mm/sec using an external fixing device.

Moreover, in order to evaluate the minimum fixing temperature and the maximum fixing temperature, while increasing the preset temperature of a fixing roll in the external fixing device in increments of 5° C. from 90° C., the image is fixed. In each fixing temperature, the crease is made on the inside of the centre of the solid part of the fixed toner image on a paper on which the image is formed, the part in which the fixing toner image is destroyed is wiped by a tissue paper, the white line width is measured, and the temperature at which the line width becomes 0.5 mm or less is set to the minimum fixing temperature (MET) and the maximum fixing temperature.

In addition, the fixing latitude (width of fixable temperature region) is calculated from the obtained minimum fixing temperature and the maximum fixing temperature.

TABLE 1

|  |  | Example 1 | Example 2 | Example 3 | Comparative Example 1 |
|---|---|---|---|---|---|
| | Developer No. | (1) | (2) | (3) | (C1) |
| | PE resin No. | (1) | (2) | (3) | (C1) |
| Composition and physical properties of PE resin | Method of synthesis | Ester-exchanging method | Ester-exchanging method | Ester-exchanging method | Direct esterification method |
| | Content of unreacted carboxylic acid (% by weight) | 0.2 | 0.2 | 0.5 | 1.0 |
| | Content of rosin (% by weight) | 0.8 | 0.8 | 0.9 | 1.2 |
| | Acid value (mg KOH/g) | 13.5 | 12.1 | 11.3 | 14.5 |
| | Hydroxyl value (mg KOH/g) | 18.3 | 19.3 | 22.0 | 25.4 |
| | Difference between acid value and hydroxyl value (mg KOH/g) | 4.8 | 7.2 | 10.7 | 10.9 |
| Evaluation of PE resin | Emulsifiability | G1 | G1 | G2 | G3 |
| Evaluation of developer | Fixing latitude (° C.) | 55 | 50 | 50 | 30 |

TABLE 1-continued

|  |  | Example 4 | Example 5 | Comparative Example 2 | Comparative Example 3 |
|---|---|---|---|---|---|
|  | Developer No. | (4) | (5) | (C2) | (C3) |
|  | PE resin No. | (4) | (5) | (C2) | (C3) |
| Composition and physical properties of PE resin | Method of synthesis | Direct esterification method | Ester-exchanging method | Direct esterification method | Direct esterification method |
|  | Content of unreacted carboxylic acid (% by weight) | 0.4 | 0.3 | 1.1 | 1.2 |
|  | Content of rosin (% by weight) | 0.9 | 0.7 | 0.9 | 1.3 |
|  | Acid value (mg KOH/g) | 10.2 | 19.6 | 13.8 | 16.5 |
|  | Hydroxyl value (mg KOH/g) | 21.4 | 29.5 | 25.8 | 28.0 |
|  | Difference between acid value and hydroxyl value (mg KOH/g) | 11.2 | 9.9 | 12.0 | 11.5 |
| Evaluation of PE resin | Emulsifiability | G2 | G1 | G4 | G4 |
| Evaluation of developer | Fixing latitude (° C.) | 45 | 45 | 25 | 25 |

From the results described above, in the present Examples, it is understood that the emulsifiability of the polyester resin is high, compared to Comparative Examples.

In addition, in the present Examples, it is understood that the evaluation of the fixing property (fixing latitude) of the developer is excellent, compared to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyester resin that is a polymer of a carboxylic acid component and an alcohol component including a rosin diol represented by the following formula (1),
wherein an acid value is from 10 mg KOH/g to 30 mg KOH/g, a content of carboxylic acid having a rosin skeleton in the resin is 1% by weight or less, and a content of carboxylic acid except carboxylic acid having the rosin skeleton in the resin is 1% by weight or less:

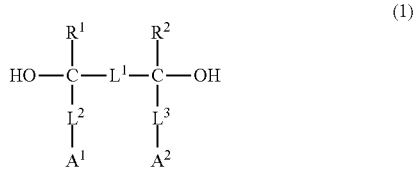

(1)

wherein in the formula (1),
R1 and R2 each independently represent hydrogen or a methyl group;
L1, L2 and L3 each independently represent a divalent linking group selected from the group consisting of a carbonyl group, a carboxyl group, an ether group, a sulphonyl group, a chain alkylene group that may have a substituent, a cyclic alkylene group that may have a substituent, an arylene group that may have a substituent, and combinations thereof, and L1 and L2 or L1 and L3 may form a ring; and
A1 and A2 represent a rosin ester group.

2. The polyester resin according to claim 1,
wherein
the rosin diol represented by the formula (1) is a compound produced by reacting a rosin with a bifunctional epoxy compound at a ratio in a range from 1.01 mols to 1.2 mols of a bifunctional epoxy compound with respect to 2 mols of a rosin.

3. The polyester resin according to claim 1,
wherein
the rosin diol represented by the formula (1) is a compound produced by reacting a rosin with a bifunctional epoxy compound at a ratio in a range from 1.03 mols to 1.15 mols of a bifunctional epoxy compound with respect to 2 mols of a rosin.

4. The polyester resin according to claim 1,
wherein
the rosin diol represented by the formula (1) is a compound produced by reacting a rosin with a bifunctional epoxy compound at a ratio in a range from 1.05 mols to 1.1 mols of a bifunctional epoxy compound with respect to 2 mols of a rosin.

5. The polyester resin according to claim 1, wherein the acid value of the polyester resin is from 10 mg KOH/g to 20 mg KOH/g.

6. The polyester resin according to claim 1, wherein the acid value of the polyester resin is from 10 mg KOH/g to 15 mg KOH/g.

7. The polyester resin according to claim 1, wherein a hydroxyl value is from 10 mg KOH/g to 30 mg KOH/g and a difference between the acid value and the hydroxyl value is 10 mg KOH/g or less.

8. The polyester resin according to claim 7, wherein the hydroxyl value of the polyester resin is from 10 mg KOH/g to 20 mg KOH/g and the difference between the acid value and the hydroxyl value is 5 mg KOH/g or less.

9. The polyester resin according to claim 1, wherein the content of carboxylic acid having the rosin skeleton in the resin is 0.8% by weight or less.

10. The polyester resin according to claim 1, wherein the content of carboxylic acid having the rosin skeleton in the resin is 0.5% by weight or less.

11. The polyester resin according to claim 1, wherein the content of carboxylic acid except carboxylic acid having the rosin skeleton in the resin is 0.5% by weight or less.

12. The polyester resin according to claim 1, wherein
the content of carboxylic acid except carboxylic acid having the rosin skeleton in the resin is 0.3% by weight or less.

13. An electrostatic charge image developing toner, comprising:
the polyester resin according to claim 1.

14. A toner container that accommodates the electrostatic charge image developing toner according to claim 13.

* * * * *